(12) United States Patent
Momiyama et al.

(10) Patent No.: US 9,383,204 B2
(45) Date of Patent: Jul. 5, 2016

(54) SURVEYING SYSTEM

(75) Inventors: Homare Momiyama, Tokyo (JP);
Masaru Muraki, Tokyo (JP)

(73) Assignee: SOKKIA TOPCON CO., LTD., Tokyo (JP)

( * ) Notice: Subject to any disclaimer, the term of this patent is extended or adjusted under 35 U.S.C. 154(b) by 525 days.

(21) Appl. No.: 13/991,484

(22) PCT Filed: Nov. 18, 2011

(86) PCT No.: PCT/JP2011/076655
§ 371 (c)(1),
(2), (4) Date: Jun. 4, 2013

(87) PCT Pub. No.: WO2012/077483
PCT Pub. Date: Jun. 14, 2012

(65) Prior Publication Data
US 2013/0262026 A1    Oct. 3, 2013

(30) Foreign Application Priority Data
Dec. 10, 2010    (JP) ................................ 2010-275378

(51) Int. Cl.
*G01C 15/00*    (2006.01)
*G01S 19/14*    (2010.01)
*G01S 19/51*    (2010.01)
*G01C 5/06*    (2006.01)

(52) U.S. Cl.
CPC ............ *G01C 15/008* (2013.01); *G01C 15/002* (2013.01); *G01S 19/14* (2013.01); *G01S 19/51* (2013.01); *G01C 5/06* (2013.01)

(58) Field of Classification Search
CPC ...... G01C 15/002; G01C 15/008; G01C 5/06; G01C 15/00; G01C 21/00; G01S 19/14; G01S 19/51; H01Q 1/125; H01Q 1/22; H01Q 21/28; H01Q 3/04

USPC ............ 702/3, 92, 94, 95, 97, 122, 130, 138, 702/151, 154, 158; 342/357.25, 357.29, 342/357.41, 386; 343/765
See application file for complete search history.

(56) References Cited

U.S. PATENT DOCUMENTS

| 6,175,328 B1 | 1/2001 | Ericsson et al. |
| 8,018,382 B2 * | 9/2011 | Shore .................... G01C 15/00 342/386 |
| 2013/0162469 A1 * | 6/2013 | Zogg ................... G01C 15/002 342/357.25 |

FOREIGN PATENT DOCUMENTS

| JP | 08-178652 A | 7/1996 |
| JP | 2001-091635 A | 4/2001 |
| JP | 2001-505666 A | 4/2001 |
| JP | 2007-271627 A | 10/2007 |

* cited by examiner

*Primary Examiner* — John H Le
(74) *Attorney, Agent, or Firm* — Roberts Mlotkowski Safran & Cole P.C.

(57) ABSTRACT

A controller (26) of a surveying instrument including a GPS receiver (28) and a transmitter and receiver section (24) for communicating with a prism device including a GPS receiver (58), an atmospheric pressure sensor (60), a temperature sensor (32), and a transmitter and receiver section (54) for communicating with the surveying instrument calculates an azimuth angle of the prism device when viewed from the surveying instrument and a distance therebetween from positions of the prism device and surveying instrument obtained from the GPS receivers, further calculates an elevation angle of the prism device when viewed from the surveying instrument from the distance and atmospheric pressures at the positions of the prism device and surveying instrument, and issues a rotation command to a horizontal drive section (16) and a vertical drive section (18), so that a collimating telescope can be immediately and automatically directed toward a reflecting prism for measurement.

4 Claims, 6 Drawing Sheets

SURVEYING SYSTEM

TECHNICAL FIELD

The present invention relates to a survey system made up of a reflecting prism (target) and a surveying instrument capable of automatically directing a collimating telescope toward the reflecting prism at the time of measurement.

BACKGROUND ART

At a survey site, it is common to measure azimuth angles, elevation angles, and distances of a plurality of survey points with respect to a single reference point. In such a case, conventionally, two workers have been necessary, namely, one worker for moving a reflecting prism between the survey points and another worker who is at the reference point, for collimating the reflecting prism located on each of the survey points by looking through a collimating telescope of a surveying instrument located on the reference point.

In recent years, surveying instruments including automatic collimators or automatic trackers have been put into practical use. An automatic collimator is a device for automatically collimating a reflecting prism by rotating a collimating telescope, while an automatic tracker is a device structured to rotate a collimating telescope automatically so as to always maintain a reflecting prism in a collimated state. When a remotely controllable surveying instrument including an automatic collimator or an automatic tracker is used, the surveying instrument can be controlled by a remote control from the reflecting prism side, and thus the worker on the reference point side becomes no longer necessary.

However, in a surveying instrument including an automatic collimator, there has been a problem that it takes time for the surveying instrument to find a reflecting prism if the collimating telescope is not pre-directed in the direction of a reflecting prism. If with a surveying instrument including an automatic tracker, measurement can be immediately performed after placing a reflecting prism at a survey point, but when moving the reflecting prism, it has been necessary to move the reflecting prism slowly so as not to stray away from the field of view of the collimating telescope while always directing the reflecting prism toward the surveying instrument. There has been a problem that, if the reflecting prism strays away from the field of view of the collimating telescope as a result of directing the reflecting prism in a direction different from that of the surveying instrument, quickly moving the reflecting prism, or an obstacle being located between the surveying instrument and reflecting prism, automatic tracking can no longer be performed.

In order to solve such problems, a total station (combination electronic transit and electronic distance measuring device) has been proposed (refer to the following patent document 1), for which each of the total station and reflecting prism includes a GPS receiver, and receives radio waves from GPS satellites to determine the position of each of the total station and reflecting prism and calculate the azimuth angle and elevation angle of the reflecting prism when viewed from the total station, so that the collimating telescope can be immediately directed toward the reflecting prism at the time of measurement by using the azimuth angle and elevation angle.

CITATION LIST

Patent Literature

Patent Literature 1: Japanese Published Unexamined Patent Application No. H08-178652

SUMMARY OF INVENTION

Technical Problem

Meanwhile, in position measurement using GPS satellites, there is a drawback that errors in the elevation direction are larger than those in the horizontal direction. Therefore, there is a problem that even when the survey system made up of a total station and a reflecting prism disclosed in the above-described patent literature 1 is used, the elevation angle of the reflecting prism has large errors, so that the collimating telescope cannot be swiftly and automatically directed toward the reflecting prism at the time of measurement in many cases.

In order to solve the problem described above, it is an object of the present invention to provide a survey system structured to be capable of quickly and automatically directing the collimating telescope toward the reflecting prism at the time of measurement.

Solution to Problem

A first aspect of the present invention is a survey system made up of a prism device including a reflecting prism and a surveying instrument including a horizontal drive section for horizontally rotating a collimating telescope, a vertical drive section for vertically rotating the collimating telescope, and a control means for controlling both drive sections, in which the prism device includes a prism-side GPS receiver for detecting a position, an atmospheric pressure sensor for detecting an atmospheric pressure, and a prism-side transmitter and receiver section for communicating with the surveying instrument, the surveying instrument includes a surveying instrument-side GPS receiver for detecting a position and a surveying instrument-side transmitter and receiver section for communicating with the prism device, and the control means of the surveying instrument includes an azimuth angle and distance calculating means for calculating an azimuth angle of the prism device when viewed from the surveying instrument and a distance between the surveying instrument and the prism device from a position of the prism device and a position of the surveying instrument, an elevation angle calculating means for calculating an elevation angle of the prism device when viewed from the surveying instrument from the distance and an atmospheric pressure at the position of the prism device and an atmospheric pressure at the position of the surveying instrument, and a rotation command means for issuing a rotation command to the horizontal drive section and the vertical drive section so that the collimating telescope is directed toward the prism device based on the azimuth angle and the elevation angle.

A second aspect of the present invention is the invention according to the first aspect, in which the prism device includes a temperature sensor for detecting a temperature, and the elevation angle calculating means calculates the elevation angle taking into consideration a temperature detected by the temperature sensor.

A third aspect of the present invention is a survey system made up of a prism device including a reflecting prism and a surveying instrument including a horizontal drive section for horizontally rotating a collimating telescope, a vertical drive section for vertically rotating the collimating telescope, and a control means for controlling both drive sections, in which the prism device includes a prism-side GPS receiver for detecting a position, an atmospheric pressure sensor for detecting an atmospheric pressure, and a prism-side transmitter and receiver section for communicating with the surveying instrument, the surveying instrument includes a surveying instrument-side transmitter and receiver section for communicating with the prism device, and the control means of the surveying instrument includes a surveying instrument-side position and atmospheric pressure storage means for detecting a position of the surveying instrument by means of the prism-side GPS receiver and detecting an atmospheric pressure at the position of the surveying instrument by use of the atmospheric pressure sensor and storing the detected position and atmospheric pressure, an azimuth angle and distance calculating means for calculating an azimuth angle of the prism device when viewed from the surveying instrument and a distance between the surveying instrument and the prism device from a position of the prism device obtained from the GPS receiver and a position of the surveying instrument, an elevation angle calculating means for calculating an elevation angle of the prism device when viewed from the surveying instrument from the distance and an atmospheric pressure at the position of the surveying instrument and an atmospheric pressure at the position of the prism device, and a rotation command means for issuing a rotation command to the horizontal drive section and the vertical drive section so that the collimating telescope is directed toward the prism device based on the azimuth angle and the elevation angle.

A fourth aspect of the present invention is the invention according to the third aspect, in which the prism device includes a temperature sensor for detecting a temperature, and the elevation angle calculating means calculates an elevation angle of the prism device when viewed from the surveying instrument taking into consideration a temperature detected by the temperature sensor.

A fifth aspect of the present invention is the invention according to any one of the first to fourth aspects, in which the prism-side transmitter and receiver section is a transmitter and receiver section of a remote control for controlling the surveying instrument, the surveying instrument-side transmitter and receiver section is a transmitter and receiver section for performing communication with the remote control, and the horizontal drive section and the vertical drive section are a horizontal drive section and a vertical drive section of an automatic collimator.

A sixth aspect of the present invention is the invention according to any one of the first to fourth aspects, in which the prism-side transmitter and receiver section is a transmitter and receiver section of a remote control for controlling the surveying instrument, the surveying instrument-side transmitter and receiver section is a transmitter and receiver section for performing communication with the remote control, and the horizontal drive section and the vertical drive section are a horizontal drive section and a vertical drive section of an automatic tracker.

Advantageous Effects of Invention

According to the first aspect of the present invention, the prism device includes a prism-side GPS receiver for detecting a position, an atmospheric pressure sensor for detecting an atmospheric pressure, and a prism-side transmitter and receiver section for communicating with the surveying instrument, the surveying instrument includes a surveying instrument-side GPS receiver for detecting a position and a surveying instrument-side transmitter and receiver section for communicating with the prism device, and thus the control means of the surveying instrument can, with the prism device made adjacent beforehand at the same height as the surveying instrument placed on a reference point, measure and store the atmospheric pressure at the position of the surveying instrument by use of the atmospheric pressure sensor. Then, when the prism device is carried to a survey point and placed there, the azimuth angle of the prism device when viewed from the surveying instrument and the distance therebetween can be calculated by use of the position of the prism device obtained from the prism-side GPS receiver and the position of the surveying instrument obtained from the surveying instrument-side GPS receiver, and further, the elevation angle of the prism device when viewed from the surveying instrument can be calculated from the distance therebetween and the atmospheric pressure at the position of the surveying instrument and the atmospheric pressure at the position of the prism device obtained from the atmospheric pressure sensor can be calculated. In this case, the height obtained from the GPS receiver with large errors is not used in calculation of the elevation angle of the prism device, but the atmospheric pressure at the position of the prism device and the atmospheric pressure at the position of the surveying instrument are used to calculate a difference in height therebetween, and the elevation angle is calculated from the difference in height and the distance therebetween, and thus the elevation angle has high accuracy. By issuing command signals to the horizontal drive section and vertical drive section from the control means according to the azimuth angle and elevation angle thus calculated, the collimating telescope can be quickly and automatically directed toward the reflecting prism. When the present invention is applied to a surveying instrument including an automatic collimator or an automatic tracker and can be remotely controlled by a remote control, a worker on the prism device side can perform the measuring work on his/her own, and is also able to direct the collimating telescope toward the reflecting prism more quickly and reliably than conventionally done, so that a quick measurement can be performed.

According to the second aspect of the present invention, the prism device further includes a temperature sensor, so that the elevation angle calculating means can more accurately calculate the difference in height between the surveying instrument and prism device by taking the temperature into consideration. Accordingly, the elevation angle of the prism device when viewed from the surveying instrument can be more accurately calculated, and thus the collimating telescope can be directed toward the reflecting prism more quickly and reliably at the time of measurement.

According to the third aspect of the present invention, the prism device includes a prism-side GPS receiver for detecting a position, an atmospheric pressure sensor for detecting an atmospheric pressure, and a prism-side transmitter and receiver section for communicating with the surveying instrument, the surveying instrument includes a surveying instrument-side transmitter and receiver section for communicating with the prism device, and thus the control means of the surveying instrument can, with the prism device made adjacent beforehand at the same height as the surveying instrument placed on a reference point, measure the position of the surveying instrument by means of the GPS receiver and measure the atmospheric pressure at the position of the surveying instrument by use of the atmospheric pressure sensor and store the measured position and atmospheric pressure as a surveying instrument position and a surveying instrument-side atmospheric pressure, respectively. Then, the prism device is carried to a survey point and placed there, the azimuth angle of the prism device when viewed from the surveying instrument and the distance therebetween are calculated from the position of the prism device obtained from the GPS receiver and the previously stored position of the surveying instrument, and further, the elevation angle of the prism device when viewed from the surveying instrument is calculated from the distance therebetween and the atmospheric pressure at the position of the surveying instrument and the atmospheric pressure at the position of the prism device obtained from the atmospheric pressure sensor. In this case, the height obtained from the GPS receiver with large errors is not used in calculation of the elevation angle of the prism device, but the atmospheric pressure at the position of the prism device and the atmospheric pressure at the position of the surveying instrument are used to calculate a difference in height therebetween, and the elevation angle is calculated from the difference in height and the distance therebetween, and thus the elevation angle has high accuracy. Because the collimating telescope can be directed toward the prism device similar to the first aspect of the present invention based on the azimuth angle and elevation angle thus calculated, the present aspect also provides the same effect as in the first aspect of the present invention. Moreover, the surveying instrument can be manufactured at low cost and is economical because only the program of the control means is modified, and there is no change in hardware.

According to the fourth aspect of the present invention, the prism device further includes a temperature sensor, and the control means of the surveying instrument can more accurately calculate the difference in height between the surveying instrument and prism device by taking the temperature into consideration. Accordingly, the elevation angle of the prism device when viewed from the surveying instrument can be more accurately calculated, and thus the collimating telescope can be directed toward the reflecting prism more quickly and reliably at the time of measurement.

According to a fifth aspect of the present invention, the transmitter and receiver section of the prism device is a transmitter and receiver section of a remote control for controlling the surveying instrument, the transmitter and receiver section of the surveying instrument is a transmitter and receiver section for performing communication with the remote control, and the horizontal drive section and the vertical drive section are a horizontal drive section and a vertical drive section of an automatic collimator, so that components common to those of a conventionally used remote control and automatic collimator are used, which is economical.

According to a sixth aspect of the present invention, the transmitter and receiver section of the prism device is a transmitter and receiver section of a remote control for controlling the surveying instrument, the transmitter and receiver section of the surveying instrument is a transmitter and receiver section for performing communication with the remote control, and the horizontal drive section and the vertical drive section are a horizontal drive section and a vertical drive section of an automatic tracker, so that components common to those of a conventionally used remote control and automatic tracker are used, which is economical.

DESCRIPTION EMBODIMENTS

Figure 1:
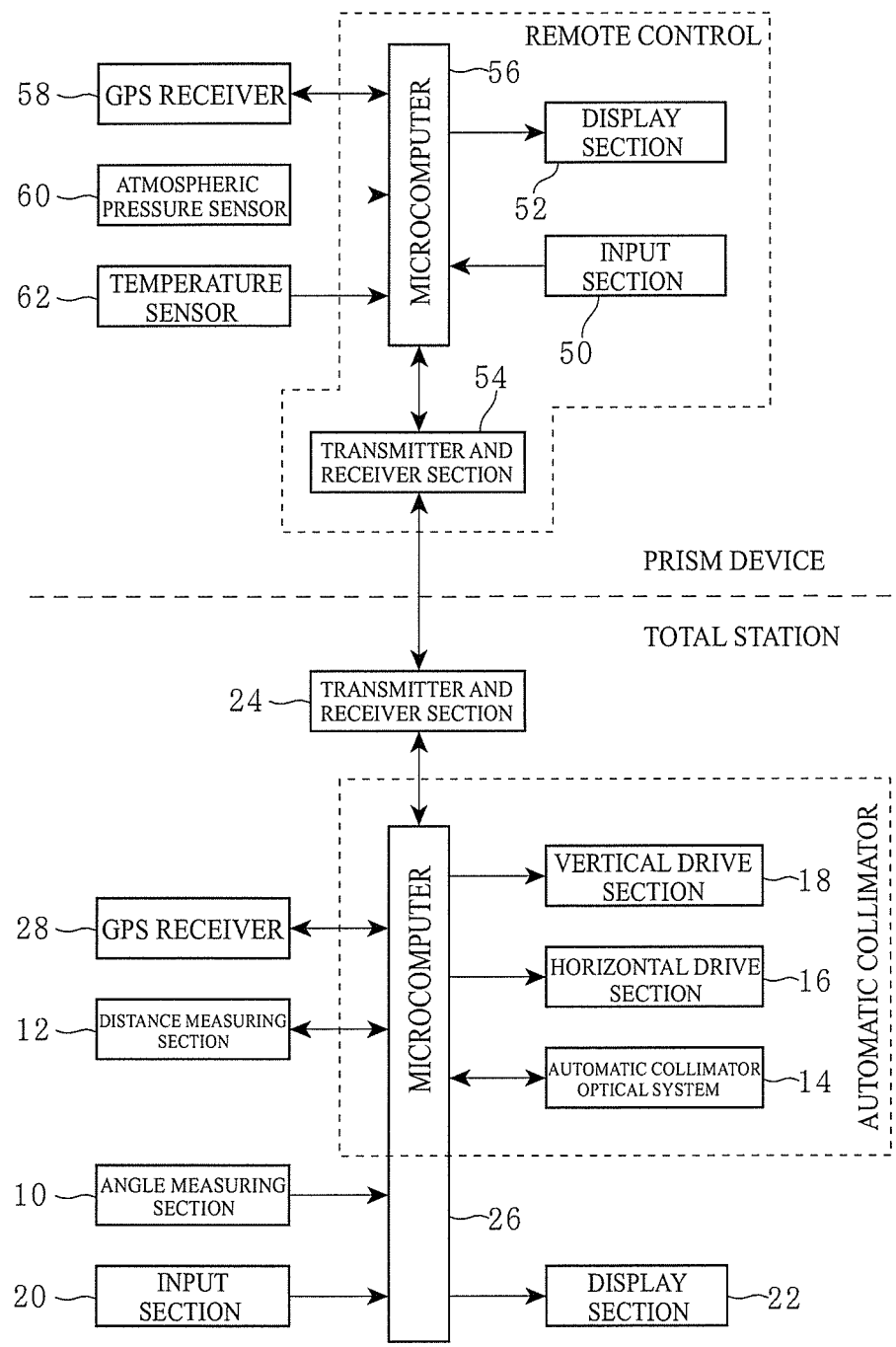
FIG. 1 is a block diagram relating to a survey system of a first embodiment of the present invention.

First, a first embodiment of the present invention will be described with reference to FIG. 1 and FIG. 2. The survey system of the present embodiment is made up of a total station and a prism device as shown in FIG. 1.

Similar to a conventional remotely controllable total station including an automatic collimator, the total station includes an angle measuring section 10 (horizontal encoder, vertical encoder) for measuring the azimuth angle and elevation angle of a reflecting prism, a distance measuring section 12 for measuring the distance to the reflecting prism, an automatic collimator optical system 14 (light emitting element, objective lens, light receiving element, etc.) for sending collimation light toward the reflecting prism and receiving the collimation light reflected and returned from the reflecting prism to detect a deviation from the collimation axis of the reflecting prism, a horizontal drive section 16 (horizontal servo motor) for rotating a collimating telescope in the horizontal direction, a vertical drive section 18 (vertical servo motor) for rotating the collimating telescope in the vertical direction, an input section 20 for inputting a command and data, a display section 22 for displaying a measured value, a command, and data, a transmitter and receiver section 24 for communicating with a remote control, and a microcomputer (control means) 26 connected to these. Further, the automatic collimator optical system 14, the horizontal drive section 16, the vertical drive section 18, and the microcomputer 26 compose an automatic collimator.

The total station (hereinafter, simply described as a "surveying instrument") further includes a GPS receiver 28 for receiving radio waves from GPS satellites to measure the position of the surveying instrument, and this is also connected to the microcomputer 26.

The prism device includes a remote control besides the reflecting prism (not shown). Similar to a conventional remote control, the remote control includes an input section 50 for inputting a command and data, a display section 52 for displaying an input command and input data, a transmitter and receiver section 54 for communicating with the surveying instrument, and a microcomputer 56 connected to these.

The prism device further includes a GPS receiver 58 for receiving radio waves from GPS satellites to measure the position of the prism device, an atmospheric pressure sensor 60 for measuring the atmospheric pressure at the position of the reflecting prism, and a temperature sensor 62 for measuring the temperature at the position of the prism device, and these are also connected to the microcomputer 56.

Each of the GPS receivers 28, 58 of the surveying instrument and prism device can determine the three-dimensional position of the surveying instrument or prism device when having received radio waves from four or more GPS satellites simultaneously. Specifically, if the position of the prism device obtained by the prism device is sent to the microcomputer 26 via the transmitter and receiver sections 54, 24, the three-dimensional relative position of the prism device relative to the surveying instrument can be calculated by the microcomputer 26. Thus, the azimuth angle and elevation angle when viewed from the surveying instrument can be calculated. However, there is a drawback that the positions obtained by the GPS receivers 28, 58 have larger errors in the elevation direction than in the horizontal direction.

Meanwhile, if the atmospheric pressure P0 (hP) and temperature t0 (° C.) at the position of the surveying instrument and the atmospheric pressure P1 (hP) and temperature t1 (° C.) at the position of the reflecting prism are found, according to Laplace's hypsometric equation, a difference in height Δh (m) therebetween is obtained by the following expressions.

$$\Delta h = 18400(1+0.00366t)\log_{10}(P0/P1) \quad (1)$$

$$\text{where, } t = (t0+t1)/2 \quad (2)$$

Therefore, from the data received by the GPS receivers 28, 58, only the azimuth angle of the reflecting prism when viewed from the surveying instrument and the distance therebetween are obtained. Then, the elevation angle of the reflecting prism when viewed from the surveying instrument can be calculated from the distance therebetween and the difference in height Δh therebetween determined from expression (1) above. When the azimuth angle and elevation angle are thus obtained, the collimating telescope can be immediately directed toward the prism device by sending a command from the microcomputer 26 to the horizontal drive section 16 and the vertical drive section 18.

In addition, humidity also needs to be considered for obtaining the difference in height Δh more accurately, but it suffices only to direct the collimating telescope toward the reflecting prism such that the reflecting prism comes within the field of view of the collimating telescope, and thus the effect of humidity is disregarded in calculation of the difference in height Δh.

Figure 2:
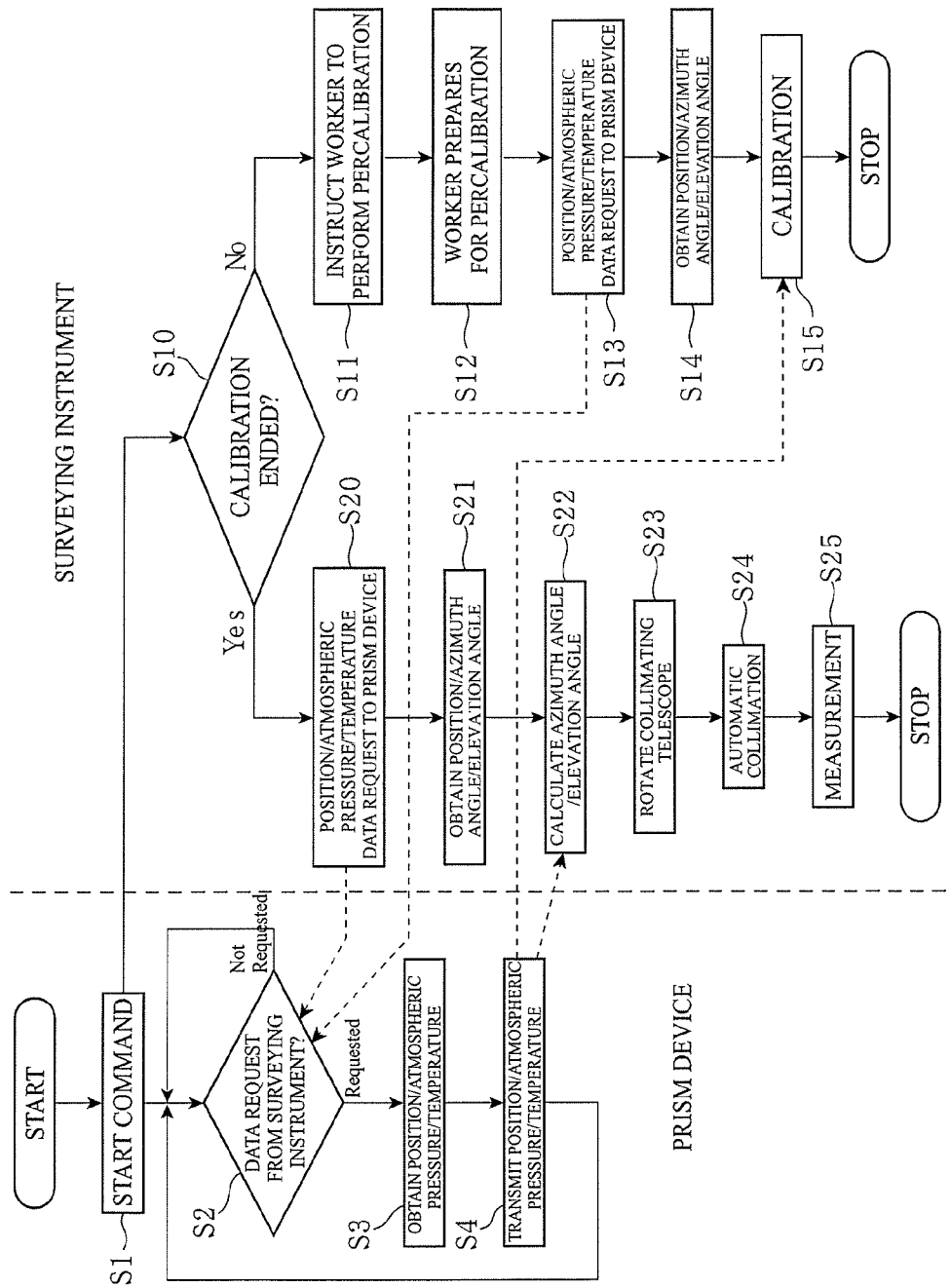
FIG. 2 is a flowchart explaining an automatic collimation program included in the survey system of the first embodiment of the present invention.

FIG. 2 shows a flowchart of an automatic collimation program to be executed by the microcomputers 26, 56 of the surveying instrument and prism device of the first embodiment.

First, a worker sets up a surveying instrument and a prism device, and presses a measurement start button of the prism device to start an automatic collimation program. Then, the process proceeds to step S1, in which a measurement start command is sent from the prism device to the surveying instrument. Then, in the prism device, the process proceeds to step S2 to wait for a request for transmission of data on the prism device position and the atmospheric pressure and temperature from the surveying instrument.

When the surveying instrument has received the measurement start command from the prism device, the process first proceeds to step S10 to check whether the GPS receivers 28, 58 have been calibrated.

If the GPS receivers 28, 58 have not been calibrated, the process proceeds to step S11 to make a display to the effect that calibration is requested on the display sections 22, 52 so as to instruct the worker to perform calibration. Next, the process proceeds to step S12, in which the worker prepares for calibration, specifically, he/she places the surveying instrument on a reference point and makes the surveying instrument and reflecting prism adjacent at the same height.

When the preparation for calibration ends, the process proceeds to step S13 to transmit, from the surveying instrument to the prism device, a data request for the prism device position and the atmospheric pressure and temperature at that position. Then, the process proceeds to step S14 to obtain the surveying instrument position from the GPS receiver 28 and obtain the azimuth angle and elevation angle from the angle measuring section 10.

While the surveying instrument is executing step S14, the prism device receives the data request, and the process proceeds to step S3 to obtain the prism device position from the GPS receiver 58, obtain the atmospheric pressure P1 from the atmospheric pressure sensor 60, and obtain the temperature t1 from the temperature sensor 62. Then, the process proceeds to step S4 to transmit the data on the prism device position and the atmospheric pressure P1 and temperature t1 to the surveying instrument. Then, the process returns to step S2 to again wait for a data request for the position and the atmospheric pressure P1 and temperature t1 from the surveying instrument.

When the surveying instrument has received the data on the position and the atmospheric pressure P1 and temperature t1 from the prism device, the process proceeds to step S15 to perform calibration. Specifically, the surveying instrument detects a difference in position between the surveying instrument and prism device, and stores the difference as a correction value. Moreover, the surveying instrument stores the atmospheric pressure P1 and temperature t1 sent and received at this time as atmospheric pressure P0 and temperature t0 at the position of the surveying instrument. The azimuth angle and elevation angle are stored as a current direction of the collimating telescope. Then, the surveying instrument displays completion of the calibration on the display sections, and stops the automatic collimation program.

After confirming completion of the calibration, the worker carries the prism device to a survey point, places the prism device there, and directs the reflecting prism toward the surveying instrument. Then, the worker again presses the measurement start button of the prism device. Then, the process proceeds up to step S2 in the prism device, while the process proceeds up to step S10 in the surveying instrument, which has been described above.

If the surveying instrument has already finished calibration in step S10, the process proceeds to step S20 to transmit to the prism device a data request for the prism device position and the atmospheric pressure P1 and temperature t1 at that position, next the process proceeds to step S21 to obtain the surveying instrument position by the GPS receiver 28 and obtain the azimuth angle and elevation angle from the angle measuring section 10.

During this time, the prism device executes steps S3 to S4 as described above to obtain the data on the prism device position and the atmospheric pressure 21 and temperature t1 and transmits the data to the surveying instrument. Then, in the surveying instrument, the process proceeds to step S22 to determine the relative position of the prism device relative to the surveying instrument, and calculate therefrom the azimuth angle of the prism device when viewed from the surveying instrument and the distance therebetween. Then, the difference in height Δh therebetween is determined (refer to expression (1) and expression (2) above) from the atmospheric pressures P0 (determined in step S15), P1 (determined in step S22) and temperatures t0 (determined in step S15), t1 (determined in step S22) at the positions of both, and the elevation angle of the prism device when viewed from the surveying instrument is calculated from the distance and difference in height Δh therebetween.

In this case, for the relative position of the prism device relative to the surveying instrument, the correction value obtained by the calibration performed in step S15 is taken into consideration. Taking the correction value into consideration allows a large reduction in errors of the azimuth angle and elevation angle.

In the present embodiment described above, the GPS receivers 28, 58 determine the positions of the surveying instrument and prism device by point positioning, respectively, and relative positions of both are therefrom obtained, but it is also possible to directly obtain the relative positions of both by using kinematic positioning. Because extremely highly accurate relative positions can be obtained by the interferometric positioning, correction according to the atmospheric pressure is not necessary.

Next, the process proceeds to step S23 to rotate the collimating telescope in a direction of the azimuth angle and elevation angle calculated in step S22. Specifically, command signals according to the differences between each of the azimuth angle and elevation angle calculated in step S22 and each of the azimuth angle and elevation angle in which the collimating telescope is currently directed are sent to the horizontal drive section 16 and the vertical drive section 18, respectively, to rotate the collimating telescope in the direction of the prism device.

Next, the process proceeds to step S24 to automatically collimate the reflecting prism, and further proceeds to step S25 to measure and record the distance, azimuth angle, and elevation angle, and display the measurement result on the display section, and stops the automatic collimation program.

The worker confirms that the measurement result has been obtained, carries the prism device to a next survey point and places the prism device there. Then, the worker again presses the measurement start button of the prism device. Thereafter, in the same manner, the worker can perform measurement for a plurality of survey points on his/her own.

In the present embodiment, steps S10 to S22 up to calculating the azimuth angle of the prism device when viewed from the surveying instrument and the distance therebetween correspond to the azimuth angle and distance calculating means described in claim 1, the subsequent part of step S22 corresponds to the elevation angle calculating means described in claim 1, and step S23 corresponds to the rotation command means described in claim 1.

According to the present embodiment, the prism device includes the GPS receiver 58, the atmospheric pressure sensor 60, and the temperature sensor 62, and the surveying instrument also includes the GPS receiver 28, and thus the microcomputer 26 of the surveying instrument can determine the relative position of the prism device relative to the surveying instrument to calculate the azimuth angle of the prism device when viewed from the surveying instrument and the distance between the surveying instrument and prism device. In this case, the elevation angle of the prism device when viewed from the surveying instrument can also be calculated, but calculation of the elevation angle is not performed by using a relative position obtained from GPS satellites because GPS satellites have large errors in the elevation direction. Therefore, the elevation angle of the prism device when viewed from the surveying instrument is calculated from the distance between the surveying instrument and the prism device and the atmospheric pressure P1 and temperature t1 at the prism device position and the atmospheric pressure P0 and temperature t0 at the surveying instrument position. By issuing command signals to the horizontal drive section and vertical drive section from the control means according to the azimuth angle and elevation angle thus calculated, the collimating telescope can be quickly and automatically directed toward the reflecting prism. Moreover, because the surveying instrument includes an automatic collimator and can be controlled by a remote control, the worker on the prism device side can perform the measuring work on his/her own, and is also able to direct the collimating telescope toward the reflecting prism more swiftly and reliably than conventionally done, so that a quick measurement can be performed.

Next, a second embodiment of the present invention will be described. In the survey system of the present embodiment, the surveying instrument includes an automatic tracker and an automatic tracking program in place of the automatic collimator and automatic collimation program. Except for this aspect, the second embodiment is the same as the first embodiment described above. Because the configuration of the automatic tracker is substantially the same as that of the automatic collimator and is well known, description will be omitted.

Figure 3:
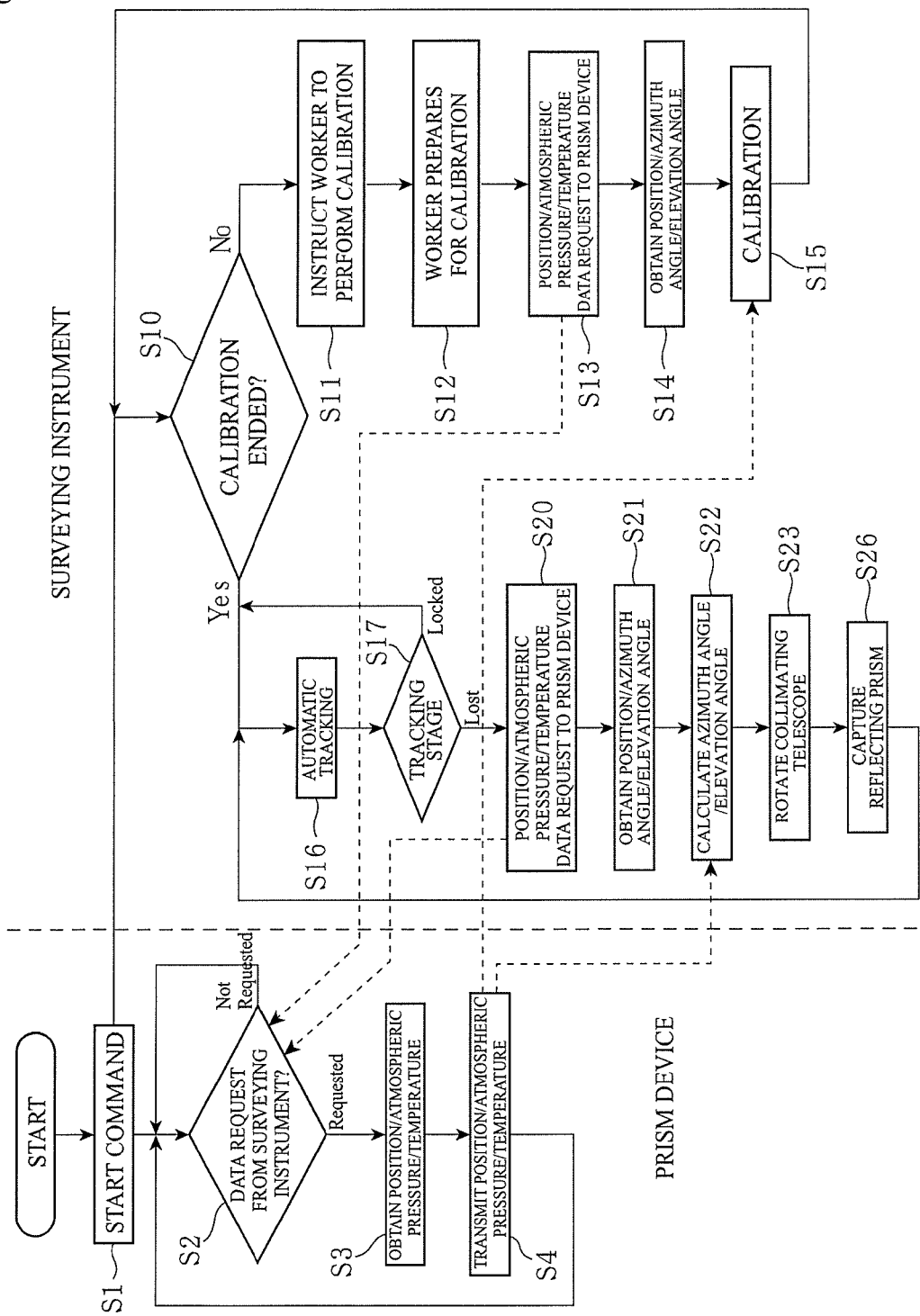
FIG. 3 is a flowchart explaining an automatic tracking program included in a survey system of a second embodiment of the present invention.

Now, the automatic tracking program included in the survey system of the present application will be described based on FIG. 3.

Steps S1 to S4 in the prism device are the same as those of the first embodiment described above. Steps S10 to S15 including finishing the calibration in the surveying instrument are also the same as those of the first embodiment described above. However, after the calibration ends, the process returns to step S10, and further proceeds to step S16 to immediately shift to automatic tracking. On the other hand, after the calibration ends, the worker carrying the prism device walks to a survey point while directing the reflecting prism toward the surveying instrument. In the surveying instrument, the process proceeds to step S17 following step S16 to check a tracking state. If it is locked in the tracking state, the process returns to S16, and thereafter, steps S16, S17 are repeated to maintain automatic tracking.

When it is detected in step S17 that the tracking state has been lost for some reason, the process proceeds to step S20. Steps S20 to S23 are the same as those of the first embodiment described above. When the collimating telescope is thus rotated in the direction of the prism device, the process proceeds to step S26, in which the reflecting prism can be captured, and automatic tracking is enabled, and the process then returns to step S16. Thereafter, steps S16, S17 are repeated to maintain automatic tracking.

If the surveying instrument maintains automatic tracking, the reflecting prism is automatically collimated as soon as the prism device is placed on a survey point, and thus the surveying instrument measures and records the distance, azimuth angle, and elevation angle as soon as the reflecting prism is automatically collimated, and displays the measurement result on the display section 22. The worker confirms that the measurement result has been obtained, carries the prism device to a next survey point, and places the prism device there, whereby a next measurement can be similarly performed.

Thus, similar to the first embodiment described above, the present embodiment also allows the worker to perform measurement for a plurality of survey points on his/her own, and provides the same effect as in the first embodiment described above.

Figure 4:
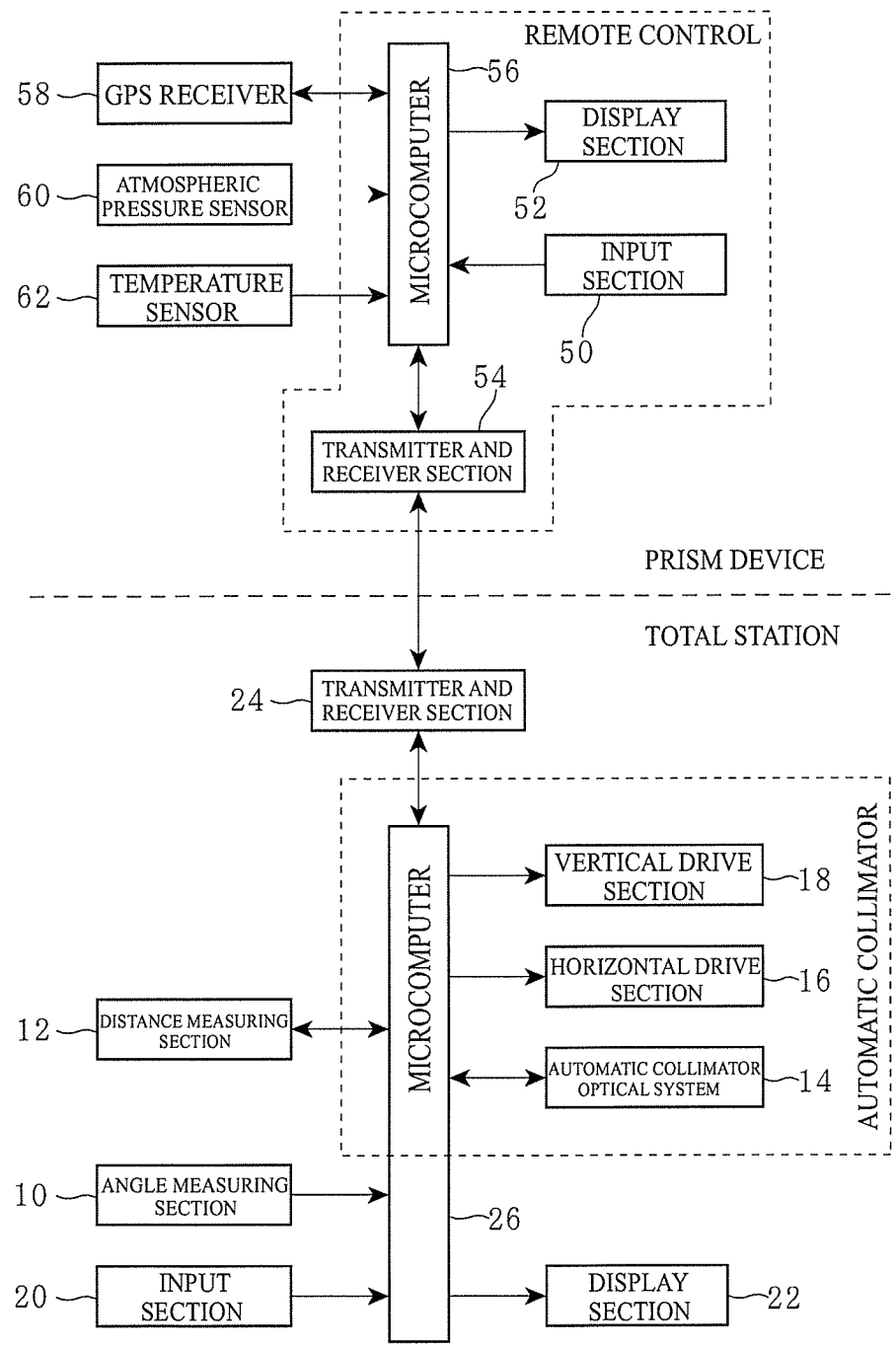
FIG. 4 is a block diagram relating to a survey system of a third embodiment of the present invention.
Figure 5:
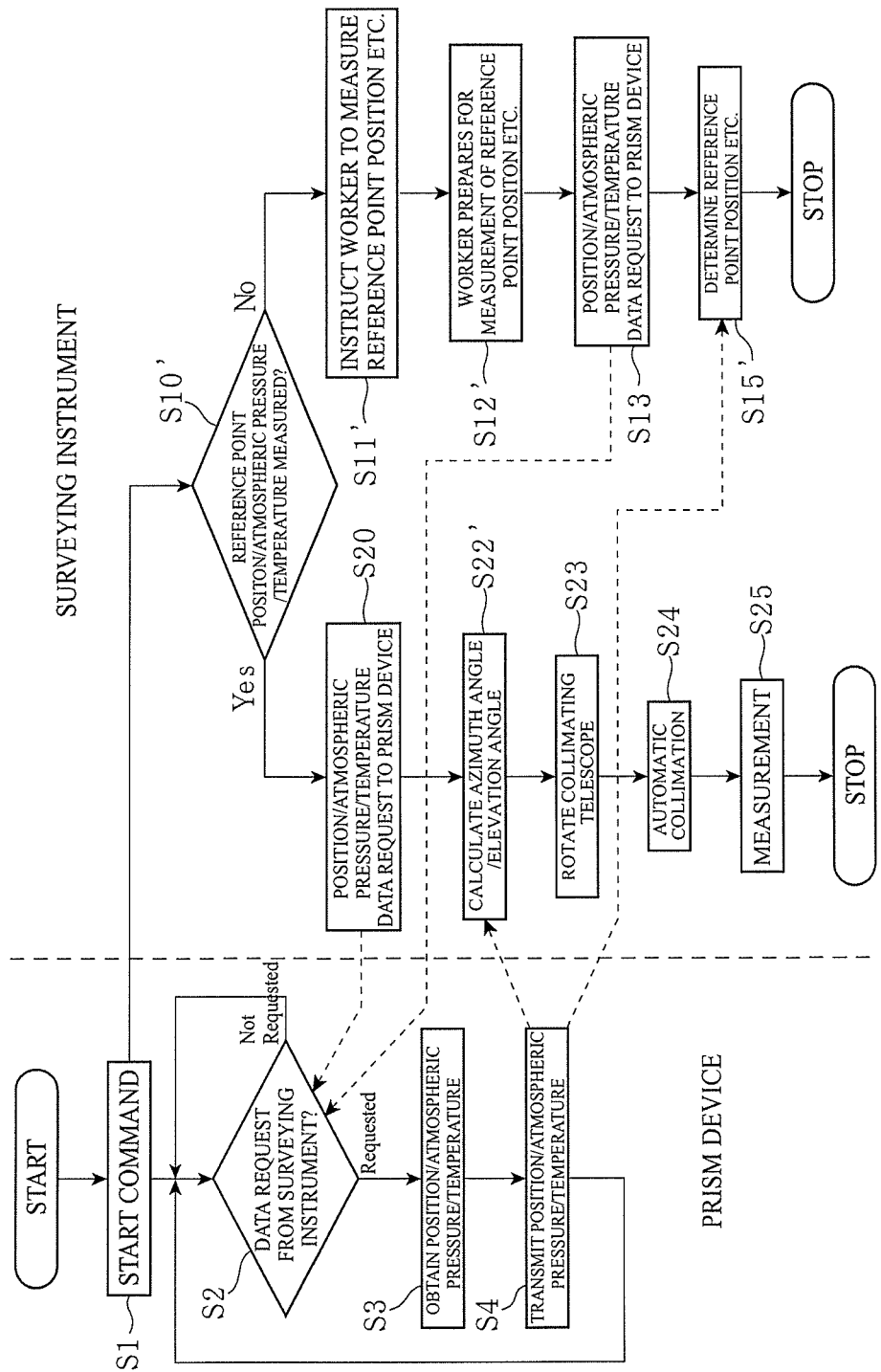
FIG. 5 is a flowchart explaining an automatic collimation program included in the survey system of the third embodiment described above.

Next, a third embodiment of the present invention will be described based on FIG. 4 and FIG. 5. As shown in FIG. 4, the prism device is the same as that of the first embodiment, but the surveying instrument does not include a GPS receiver. In the survey system, it suffices that the accuracy of the azimuth angle and elevation angle of the reflecting prism when viewed from the surveying instrument is to such an extent that the reflecting prism comes within the field of view of the collimating telescope. Therefore, before starting the measurement, the prism device is made adjacent to the surveying instrument placed on a reference point, and the reference point position is measured by use of the GPS receiver 58 of the prism device. If the position of the reference point is already known, a measured value is compared with the known coordinates to determine a correction value. Then, in the subsequent position measurement of the prism device by the GPS receiver 58, the position of the prism device is calculated taking into consideration the correction value to calculate the relative position of the prism when viewed from the surveying instrument. The following procedure is the same as in the embodiments described above. However, even when the position of the reference point is unknown and no correction value is obtained, it is possible to calculate the relative position of the prism when viewed from the surveying instrument although the accuracy is slightly inferior.

Next, an automatic collimation program included in the survey system will be described based on FIG. 5. In the automatic collimation program, there are some changes, as to be described later, from steps S10 to S15 and step S22 in the first embodiment described above to steps S10' to S15' and step S22', respectively. Except for this aspect, the automatic collimation program is the same as in the first embodiment described above.

In step S10', it is checked whether the position of a reference point and the atmospheric pressure P0 and temperature t0 have been measured, and if these have not been measured, the process proceeds to step S11' to make a display to the effect that measurement of the position of the reference point and the atmospheric pressure P0 and temperature t0 is requested on the display sections 25, 52 so as to instruct the worker to measure the position of the reference point and the atmospheric pressure and temperature. Next, the process proceeds to step S12', in which the worker prepares for the measurement of the position of the reference point and the atmospheric pressure and temperature, specifically, he/she places the surveying instrument on the reference point and makes the prism device adjacent thereto at the same height. Essentially, the prism device should be placed on the reference point, but even by making the prism device adjacent to the surveying instrument placed on the reference point, the reference point position can be measured with such accuracy as to cause no problem, and there is an advantage that the trouble thereafter of placing the surveying instrument on the reference point is avoided.

When the preparation for the measurement of the position of the reference point and the atmospheric pressure P0 and temperature t0 at that position ends, the process proceeds to step S13 to transmit to the prism device a data request for the position, atmospheric pressure P1, and temperature t1. When the position and the atmospheric pressure P1 and temperature t1 have been obtained from the prism device, the process proceeds to step S15' to store those as a reference point position and atmospheric pressure P0 and temperature t0 at that position, and thereafter, these are adopted as the position of the surveying instrument and the atmospheric pressure P0 and temperature t0 at the position of the surveying instrument. Then, the surveying instrument displays completion of the measurement of the reference point position and the reference point atmospheric pressure P0 and reference point temperature t0 on the display sections 22, 52, and stops the automatic collimation program.

After confirming completion of the measurement of the reference point position and the reference point atmospheric pressure P0 and reference point temperature t0, the worker carries the prism device to a survey point, places the prism device there, and directs the reflecting prism toward the surveying instrument. Then, the worker again presses the measurement start button of the prism device.

Then, the process immediately proceeds to step S20 through steps S1 and S10', in which the surveying instrument transmits a request for transmission of data on the position, atmospheric pressure P1, and temperature t1 to the prism device. Then, when the data on the position and the atmospheric pressure P1 and temperature t1 has been obtained from the prism device, in the surveying instrument, the process proceeds to step S22' to, as described above, calculate the azimuth angle and elevation angle of the prism device when viewed from the surveying instrument by use of the position of the prism device, atmospheric pressure P1, and temperature t1 and the position of the reference point (surveying instrument) and the atmospheric pressure P0 and temperature t0 at that position. The next step S23 onward is the same as in the first embodiment described above.

In the present embodiment, steps S10' to S15' correspond to the surveying instrument-side position and atmospheric pressure storage means described in claim 3, steps S20 to S22' up to calculating the azimuth angle of the prism device when viewed from the surveying instrument and the distance therebetween correspond to the azimuth angle and distance calculating means described in claim 3, the subsequent part of step S22' corresponds to the elevation angle calculating means described in claim 3, and step S23 corresponds to the rotation command means described in claim 3.

The present embodiment also provides the same effect as in the first embodiment described above, and the surveying instrument can be manufactured at low cost and is economical because only the automatic collimation program is modified, and there is no change in hardware.

Next, a fourth embodiment of the present invention will be described. In the survey system of the present embodiment, the surveying instrument includes an automatic tracker and an automatic tracking program in place of the automatic collimator and automatic collimation program. Except for this aspect, the fourth embodiment is the same as the third embodiment described above. Because the configuration of the automatic tracker is substantially the same as that of the automatic collimator and is well known, description will be omitted.

Figure 6:
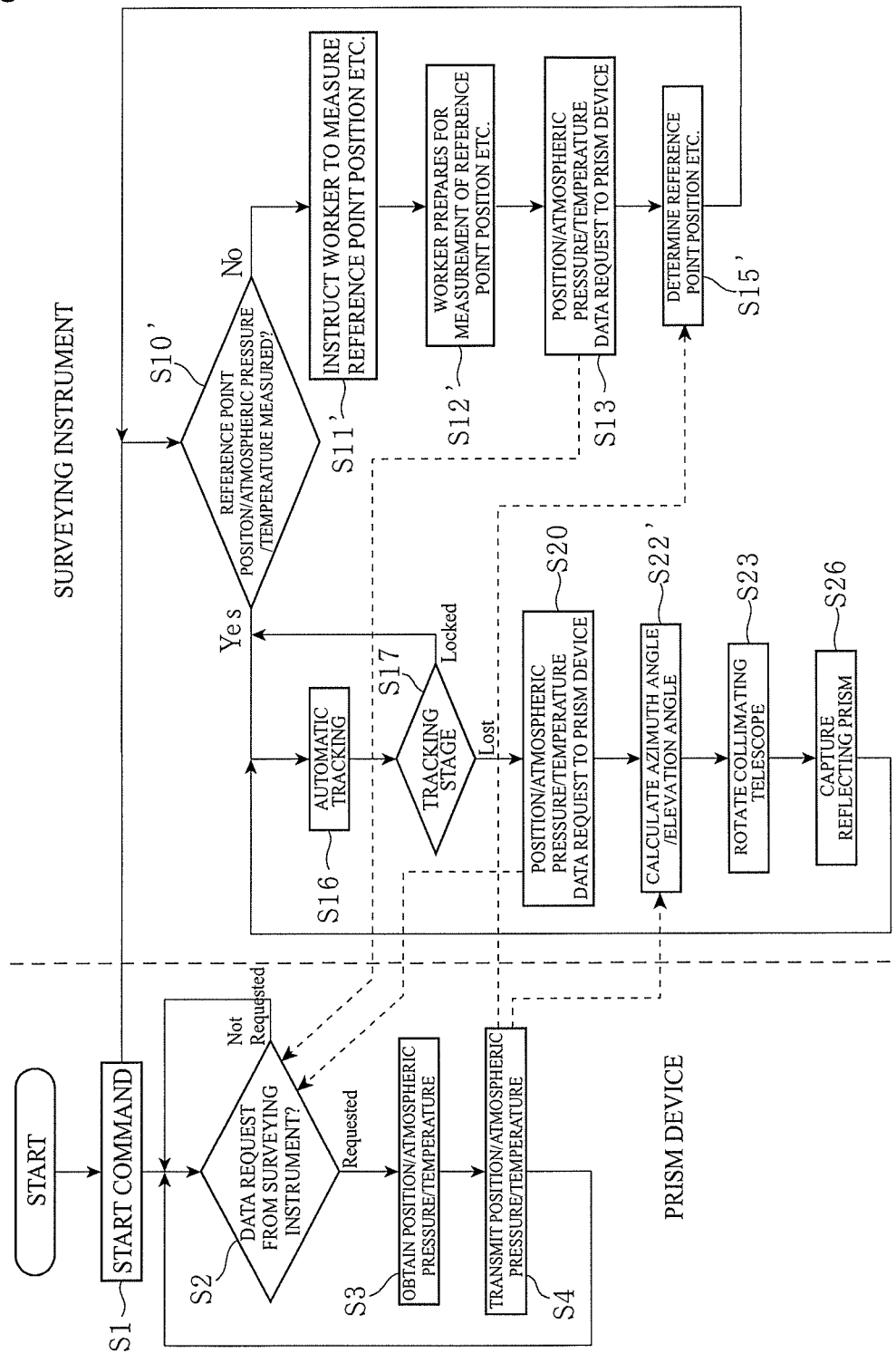
FIG. 6 is a flowchart explaining an automatic tracking program included in a survey system of a fourth embodiment of the present invention.

Now, the automatic tracking program included in the survey system will be described based on FIG. 6.

Steps S1 to S4 in the prism device are the same as those of the third embodiment described above. Steps S10' to S15' including determining the position of the reference point and the atmospheric pressure and temperature are also the same as those of the first embodiment described above. However, after this ends, the process returns to step S10', and then proceeds to step S16 to enter into automatic tracking. Next, the process proceeds to step S17 to check a tracking state, and if it is locked in the tracking state, the process returns to S16 to continue automatic tracking. When it is detected in step S17 that the tracking state has been lost for some reason, the process proceeds to step S20. Steps S20 to S23 are the same as those of the third embodiment described above. When the collimating telescope is thus rotated in the direction of the prism device, the process proceeds to step S26, in which the reflecting prism can be captured, and automatic tracking is enabled. Then, the process returns to step S16, and thereafter, steps S16, S17 are repeated to maintain automatic tracking.

If the surveying instrument maintains automatic tracking, the reflecting prism is automatically collimated as soon as the prism device is placed on a survey point, and thus the surveying instrument immediately measures and records the distance, azimuth angle, and elevation angle, and displays the measurement result on the display section 22. The worker confirms that the measurement result has been obtained, carries the prism device to a next survey point, and places the prism device there, whereby a next measurement can be similarly performed.

Similar to the third embodiment described above, the present embodiment also allows the worker to perform measurement for a plurality of survey points on his/her own, and provides the same effect as in the third embodiment described above.

The present invention is not limited to the embodiments described above, and can be variously modified. For example, in the embodiments described above, a total station has been mentioned as the surveying instrument, but the present invention can be applied to any surveying instrument as long as it includes an automatic collimator or an automatic tracker.

Moreover, in the present invention, because it suffices only to direct the collimating telescope toward the reflecting prism such that the reflecting prism comes within the field of view of the collimating telescope, the accuracy of the azimuth angle and elevation angle of the reflecting prism when viewed from the surveying instrument does not require a particularly high accuracy, and thus in the embodiments described above, the temperature sensors 32, 62 of each of the surveying instrument and prism device may be omitted, and the difference in height Δh therebetween may be calculated by setting the temperature t to ordinary temperature in expression (1) for calculating the difference in height Δh therebetween.

Further, in the embodiments described above, the transmitter and receiver section 54 of the prism device is used also as a transmitter and receiver section of the remote control to control the surveying instrument, the transmitter and receiver section 24 of the surveying instrument is used also as a transmitter and receiver section to perform communication with the remote control, and the horizontal drive section 16 and the vertical drive section 18 are used also as a horizontal drive section and vertical drive section of the automatic collimator or automatic tracker, but those sections need not to be doubled so as to change a conventional surveying instrument and remote control as little as possible.

REFERENCE SIGNS LIST

16 Horizontal drive section
18 Vertical drive section
24, 54 Transmitter and receiver section
26, 56 Microcomputer (control means)
28, 58 GPS receiver
30, 60 Atmospheric pressure sensor
32, 62 Temperature sensor

The invention claimed is:

1. A survey system made up of a prism device including a reflecting prism and a surveying instrument including a horizontal drive section for horizontally rotating a collimating telescope, a vertical drive section for vertically rotating the collimating telescope, and control means for controlling both drive sections,
wherein the prism device comprises a prism-side GPS receiver for detecting a position, an atmospheric pressure sensor for detecting an atmospheric pressure, and a prism-side transmitter and receiver section for communicating with the surveying instrument,
the surveying instrument comprises a surveying instrument-side GPS receiver for detecting a position and a surveying instrument-side transmitter and receiver section for communicating with the prism device, and
the control means of the surveying instrument includes azimuth angle and distance calculating means for calculating an azimuth angle of the prism device when viewed from the surveying instrument and a distance between the surveying instrument and the prism device from a position of the prism device and a position of the surveying instrument, elevation angle calculating means for calculating an elevation angle of the prism device when viewed from the surveying instrument from the distance and an atmospheric pressure at the position of the prism device and an atmospheric pressure at the position of the surveying instrument, and rotation command means for issuing a rotation command to the horizontal drive section and the vertical drive section so that the collimating telescope is directed toward the prism device based on the azimuth angle and the elevation angle,
wherein the prism device comprises a temperature sensor for detecting a temperature, and
the elevation angle calculating means calculates the elevation angle taking into consideration a temperature detected by the temperature sensor.

2. The survey system according to claim 1, wherein the prism-side transmitter and receiver section is a transmitter and receiver section of a remote control for controlling the surveying instrument, the surveying instrument-side transmitter and receiver section is a transmitter and receiver section for performing communication with the remote control, and the horizontal drive section and the vertical drive section are a horizontal drive section and a vertical drive section of an automatic collimator.

3. The survey system according to claim 1, wherein the prism-side transmitter and receiver section is a transmitter and receiver section of a remote control for controlling the surveying instrument, the surveying instrument-side transmitter and receiver section is a transmitter and receiver section for performing communication with the remote control, and the horizontal drive section and the vertical drive section are a horizontal drive section and a vertical drive section of an automatic tracker.

4. A survey system made up of a prism device including a reflecting prism and a surveying instrument including a horizontal drive section for horizontally rotating a collimating telescope, a vertical drive section for vertically rotating the collimating telescope, and control means for controlling both drive sections,
wherein the prism device comprises a prism-side GPS receiver for detecting a position, an atmospheric pressure sensor for detecting an atmospheric pressure, and a prism-side transmitter and receiver section for communicating with the surveying instrument,
the surveying instrument comprises a surveying instrument-side transmitter and receiver section for communicating with the prism device, and
the control means of the surveying instrument includes surveying instrument-side position and atmospheric pressure storage means for detecting a position of the surveying instrument by means of the prism-side GPS receiver and detecting an atmospheric pressure at the position of the surveying instrument by use of the atmospheric pressure sensor and storing the detected position and atmospheric pressure, azimuth angle and distance calculating means for calculating an azimuth angle of the prism device when viewed from the surveying instrument and a distance between the surveying instrument and the prism device from a position of the prism device obtained from the GPS receiver and a position of the surveying instrument, elevation angle calculating means for calculating an elevation angle of the prism device when viewed from the surveying instrument from the distance and an atmospheric pressure at the position of the surveying instrument and an atmospheric pressure at the position of the prism device, and rotation command means for issuing a rotation command to the horizontal drive section and the vertical drive section so that the collimating telescope is directed toward the prism device based on the azimuth angle and the elevation angle, wherein the prism device comprises a temperature sensor for detecting a temperature, and the elevation angle calculating means calculates an elevation angle of the prism device when viewed from the surveying instrument taking into consideration a temperature detected by the temperature sensor.

* * * * *